Dec. 18, 1923.

F. EILERS
GAUGE
Filed Sept. 1, 1920    2 Sheets-Sheet 1

1,478,328

Frank B. Eilers Inventor
By
H. G. Burns
Attorney

Dec. 18, 1923. 1,478,328
F. EILERS
GAUGE
Filed Sept. 1, 1920 2 Sheets-Sheet 2

Frank B. Eilers, Inventor
By W. G. Burns, Attorney

Patented Dec. 18, 1923.

1,478,328

UNITED STATES PATENT OFFICE.

FRANK EILERS, OF FORT WAYNE, INDIANA, ASSIGNOR TO TOKHEIM OIL TANK AND PUMP COMPANY, A CORPORATION OF INDIANA.

GAUGE.

Application filed September 1, 1920. Serial No. 407,561.

*To all whom it may concern:*

Be it known that I, FRANK B. EILERS, a citizen of the United States of America, and resident of Fort Wayne, in the county of Allen and State of Indiana, have invented certain new and useful Improvements in Gauges, of which the following is a specification.

This invention relates to improvements in gauges adapted for use in connection with liquid dispensing apparatus, especially of the visible type in which a glass measure is employed for displaying gasolene as it is dispensed. The object of the invention is to construct the gauge and apply it to a glass measure in such manner as to accurately indicate the level of liquid in the measure at various stages corresponding with definite unit quantities of liquid held therein. Another object is to so construct the device that its indicating members may be adjustably positioned and subsequently secured from tampering by unauthorized persons.

The objects of the invention are accomplished by the construction illustrated in the accompanying drawings in which.

Figure 1:
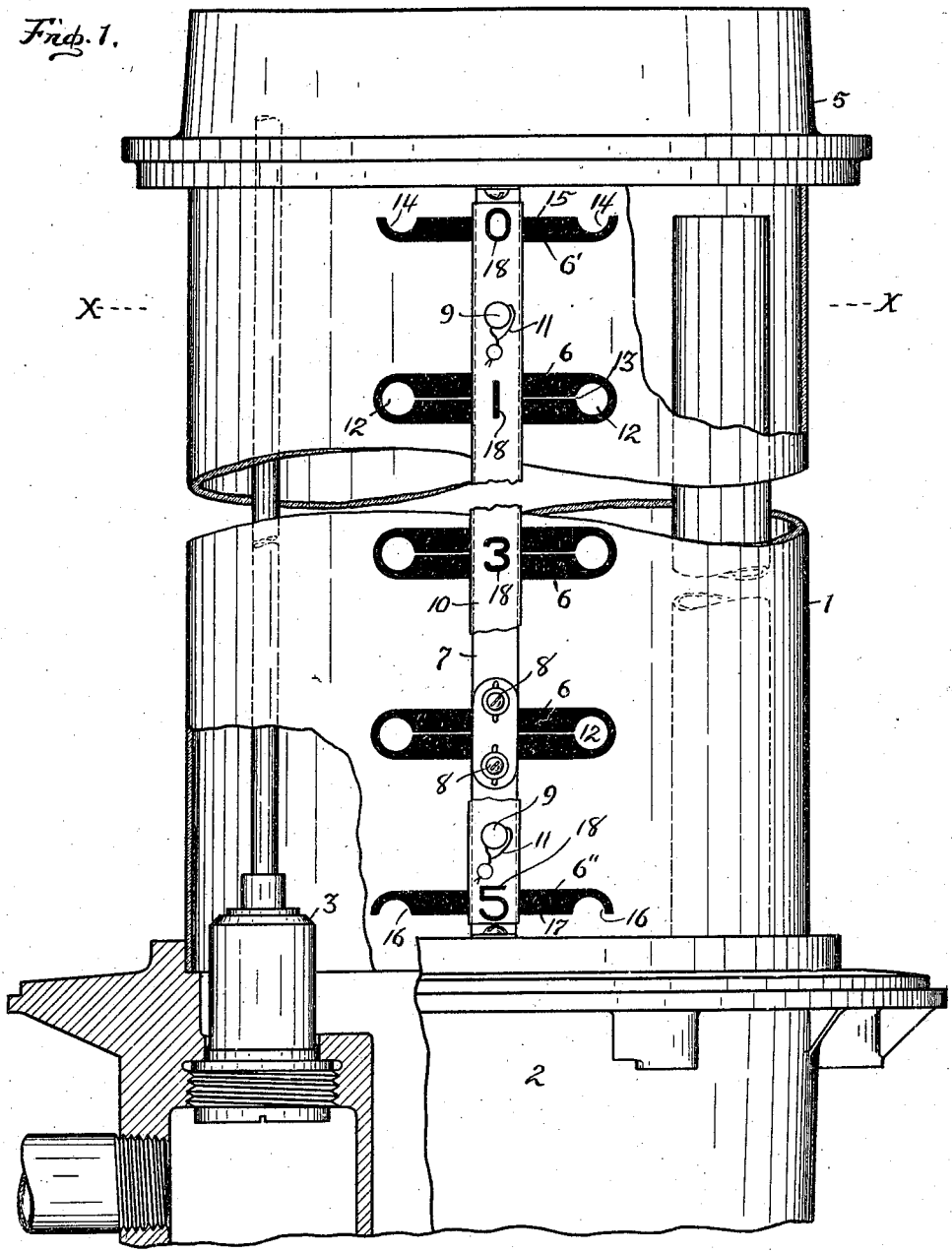
Fig. 1 is a front elevation of a glass measure showing the invention in connection therewith, there being parts shown broken away and in section.
Figure 2:
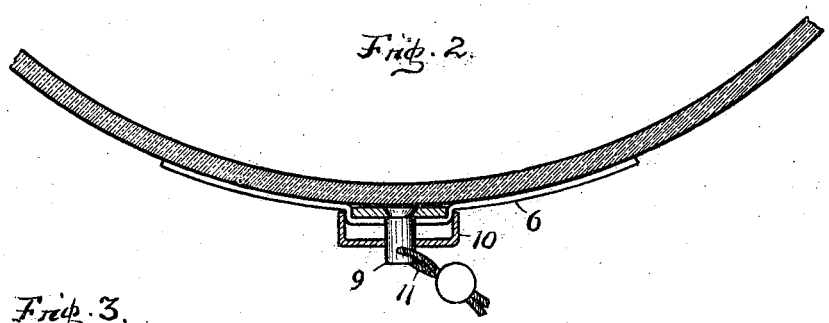
Fig. 2 is a detail view showing a transverse section of the device on the line $x$—$x$ of Fig. 1 and including the adjacent portion of the glass measure.
Figure 3:
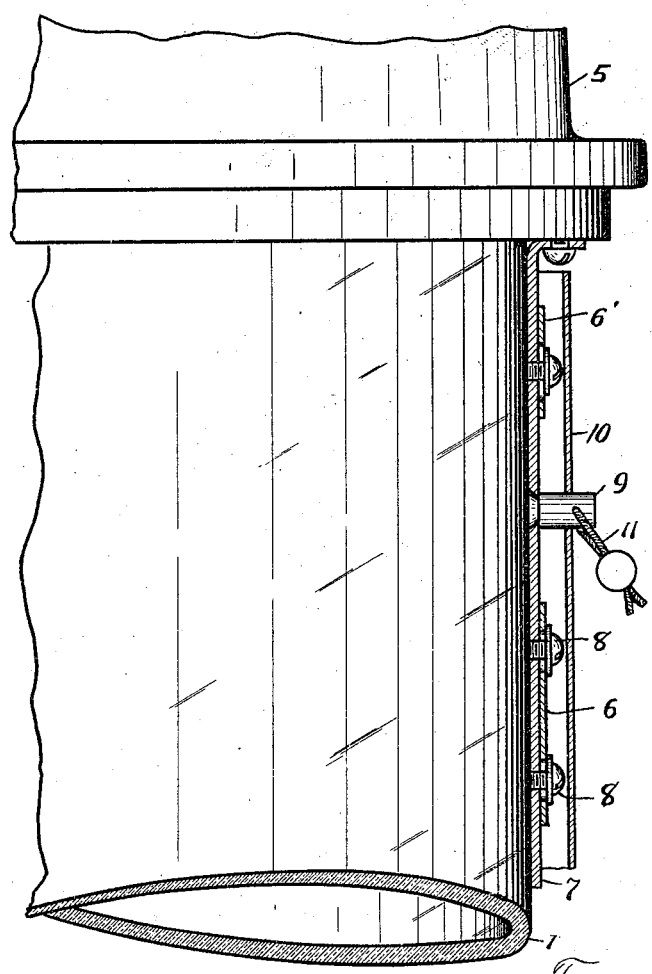
Fig. 3 is a detail view showing a portion of the device in vertical section and including the adjacent portion of the measure to which it is secured.

The invention is applicable to measures having a glass cylinder 1 into which liquid is run preliminary to being dispensed. The measure herein shown as an example includes the glass cylinder mounted upon a bowl 2 having a valve controlled outlet port 3 near the bottom of the cylinder and an overflow pipe 4, the upper end of which is near the top of the cylinder, and also a cover 5 is positioned upon the cylinder to close its upper end.

The invention is comprised of a series of indicating members 6, each of which consists of an elongated thin plate horizontally disposed and adjustably secured to a stationary supporting bar 7, the members being secured to the bar by any suitable means such as screws 8. The supporting bar 7 is vertically positioned in fixed relation with the measure so that the projecting ends of the indicating members are held against the wall of the glass cylinder.

The supporting bar 7 has two outwardly projecting studs 9, and a shield 10 is positioned so as to cover the front of the supporting bar and the screws 8 which secure the indicating members in position, the studs 9 extending through the shield and being perforated to admit of application of a seal 11 to prevent unauthorized removal of the shield and exposure of the screws 8. The uppermost indicating member 6′ and also the lowermost indicating member 6″ function in a similar manner to the members 6 and may be the same in construction if desired. Each indicating member 6 has at each end a large sight opening 12 and a horizontal narrow slot 13 that extends inwardly from each opening in line with the axis thereof. The upper most indicating member 6′ presents a downwardly extending sight recess 14 at each end thereof and a horizontal upper edge 15 that extends inwardly from each recess. The lowermost indicating member 6″ presents at each end thereof an upwardly extending sight recess 16 and a lower horizontal edge 17 that extends inwardly from each recess.

In the operation, when the measure is filled with liquid to its overflow level, the surface line thereof extends even with the upper edge 15 of the indicating member 6′ and across the recesses 14 therein. As the liquid is withdrawn from the measure the surface line of the liquid recedes and may be observed through the sight openings of the indicating members 6 as it reaches the corresponding stages. It is the intention to position the various indicating members 6 so that the surface line of liquid in the measure will show across the sight openings in line with the slots of the respective members at corresponding stages, each stage being determined by definite quantity units of liquid in the measure. When the measure has been emptied through its outlet port the surface line of the liquid remaining in the measure shows even with the lower edge 17 of the indicating member 6″ and extends in line with the lower edge across the sight recesses 16.

The upper edge of the indicating member 6′, the lower edge of the indicating member 6″, and the horizontal narrow slots in the indicating members 6 are located respectively at such levels as are attained in the measure by the surface of the liquid when the content of liquid is of the quantity corresponding with the amount the respective members are designated to indicate.

Upon the shield 10 are displayed a series of indicating characters 18 corresponding in position with the respective indicating members and being significant in each instance of the particular number of units of measurement indicated thereby. In the event the surface line of the liquid, when at rest, fails to register even with the horizontal slots or indicating edges of the members, such variation becomes plainly apparent by observing the surface line extending across the sight openings out of line with the horizontal indicating slots or edges of the members.

With the gauge members, thus constructed, the various unit quantities of liquid may be very accurately designated and easily observed as the surface line recedes during the withdrawal of the liquid from the measure.

The horizontal slots in the indicating members may be of extreme narrowness and still be plainly visible because of the light emitted therethrough, and the sight openings tend to concentrate the vision of the observer focally to the slots. Thus, the operator is aided in bringing the surface level of liquid accurately to the levels indicated respectively by the horizontal slots.

What I claim is:

1. In a gauge for transparent liquid measures, an elongated indicating member having a sight opening in each end thereof and a comparatively narrow level-indicating slot extending from each sight opening; and means for supporting the member in horizontal position.

2. In a gauge for liquid a transparent measure, a series of indicating members, each having a narrow level-indicating slot and an adjoining sight opening through which the surface line of liquid in the measure may be observed when in proximity to the slot; and means for supporting the member in operable relation with the measure so that the slots therein are held parallel with the level of liquid in the measure.

3. In a gauge for liquid a transparent measure; and a series of members mounted in juxtaposition with the measure, each having a sight opening and a comparatively narrow level indicating slot in line with the axis of the sight opening.

4. In a gauge for liquid, a transparent measure; a series of members in supported relation with the measure, each having a level-indicating means and corresponding sight openings extending therethrough and arranged in line with said means.

5. In a gauge for liquid, a transparent measure; a vertical supporting bar attached to the measure, a series of indicating members adjustably secured to the bar, each member having a level indicating means and sight openings in line therewith; and a shield secured in connection with the supporting bar, adapted to prevent tampering with said members.

6. In a gauge for liquid, a transparent measure; a supporting means attached to the measure; a series of indicating members including means for adjustably securing the same to the supporting means; and a shield removably sealed in connection with the supporting means and covering the securing means.

In testimony whereof I affix my signature, in presence of two witnesses.

FRANK EILERS.

Witnesses:
ALLAN J. TREMPER,
ALLAN TREMPER.